(12) United States Patent
Ricciardelli et al.

(10) Patent No.: US 8,075,987 B2
(45) Date of Patent: Dec. 13, 2011

(54) PRODUCT AND PROCESS FOR PRODUCING A MOLDED PRODUCT FROM RECYCLED CARPET WASTE

(75) Inventors: Thomas E. Ricciardelli, Hingham, MA (US); Michael H. King, Newton, MA (US); Michael P. Slater, East Taunton, MA (US); Steven F. Raposo, New Bedford, MA (US)

(73) Assignee: Selectech, Inc., Avon, MA (US)

( * ) Notice: Subject to any disclaimer, the term of this patent is extended or adjusted under 35 U.S.C. 154(b) by 2332 days.

(21) Appl. No.: 10/815,944

(22) Filed: Apr. 2, 2004

(65) Prior Publication Data

US 2006/0147687 A1    Jul. 6, 2006

Related U.S. Application Data

(62) Division of application No. 09/951,408, filed on Sep. 14, 2001, now Pat. No. 6,723,424, which is a division of application No. 09/152,684, filed on Sep. 14, 1998, now Pat. No. 6,306,318.

(51) Int. Cl.
*D04H 1/00* (2006.01)
*B23B 27/00* (2006.01)
*B29C 47/00* (2006.01)

(52) U.S. Cl. .............. 428/292.1; 428/297.4; 428/299.7; 264/160; 264/176.1; 264/241; 264/328.1; 264/913; 264/920; 264/921

(58) Field of Classification Search .................. 428/323, 428/330, 331, 500, 195.1, 327, 320.2
See application file for complete search history.

(56) References Cited

U.S. PATENT DOCUMENTS

| | | | |
|---|---|---|---|
| 5,053,274 A | 10/1991 | Jonas | 428/332 |
| 5,145,617 A | 9/1992 | Hermanson et al. | 264/37 |
| 5,435,954 A | 7/1995 | Wold | 264/115 |
| 5,466,320 A | 11/1995 | Burt et al. | 156/244.19 |
| 5,494,628 A | 2/1996 | Beyer et al. | 264/125 |
| 5,553,427 A | 9/1996 | Andres | 52/177 |
| 5,560,797 A | 10/1996 | Burt et al. | 156/244.19 |
| 5,616,210 A | 4/1997 | Hamilton et al. | 156/435 |
| 5,642,592 A | 7/1997 | Andres | 52/177 |
| 5,693,400 A | 12/1997 | Hamilton et al. | 428/89 |
| 5,719,198 A | 2/1998 | Young et al. | 521/40.5 |
| 5,724,783 A | 3/1998 | Mandish | 52/745.05 |
| 5,759,680 A | 6/1998 | Brooks et al. | 428/326 |
| 5,859,071 A * | 1/1999 | Young et al. | 521/40.5 |
| 6,063,846 A | 5/2000 | Weng et al. | 524/296 |
| 2002/0025414 A1 * | 2/2002 | Desai et al. | 428/195 |

* cited by examiner

*Primary Examiner* — Jennifer Chriss
*Assistant Examiner* — Camie Thompson
(74) *Attorney, Agent, or Firm* — Roylance, Abrams, Berdo & Goodman, L.L.P.

(57) ABSTRACT

A molded article such as a floor tile is made from recycled carpet waste which includes a polyvinyl chloride component in the backing material and fiber component having a melting point above the melting point of polyvinyl chloride. A mixture of the recycled carpet material is shredded and additional polyvinyl chloride is fed to an extruder where the polyvinyl chloride is melted without melting the carpet fibers. The resulting mixture is discharged and molded, such as by injection molding, to form a molded product. The molded product includes a continuous matrix of polyvinyl chloride having recycled carpet fibers uniformly dispersed therein. The molded article contains about 45% to about 85% of polyvinyl chloride, about 5% to about 20% of recycled carpet fibers, up to about 5% of a plasticizer and up to about 5% of an ethylene copolymer by weight based on the total weight of the product. The finished product preferably contains about 10% to about 75% by weight of recycled vinyl-backed carpet and about 25% to about 90% by weight of a flexible polyvinyl chloride based on the total weight of the product.

22 Claims, 2 Drawing Sheets

PRODUCT AND PROCESS FOR PRODUCING A MOLDED PRODUCT FROM RECYCLED CARPET WASTE

This application is a divisional application of Ser. No. 09/951,408, filed Sep. 14, 2001, now U.S. Pat. No. 6,723,424, which is a divisional application of Ser. No. 09/152,684, filed Sep. 14, 1998, now U.S. Pat. No. 6,306,318.

FIELD OF THE INVENTION

The present invention is directed to a molded product from recycled carpet waste. More particularly, the invention is directed to a process of producing a molded product from recycled carpet wherein the molded product includes carpet fibers dispersed in a polyvinyl chloride matrix.

BACKGROUND OF THE INVENTION

Plastics are in common use in a large portion of consumer products. The increased use of plastics is, to a large extent, due to the low cost of plastics in comparison to other materials. In addition, plastics provide durability and strength that are not available from other materials. An inherent property of most plastic materials is that they are not readily biodegradable. This creates a large volume of waste in landfills.

In recent years, there has been increased awareness of the disposal difficulties of plastics and an increased effort to recycle plastic materials. Many plastics are very difficult to recycle into usable materials. Although most thermoplastics can be remelted, the properties of the resulting blend of polymers are difficult to control. The processing properties of most recycled plastics are sufficiently different from the virgin plastic that extruding and molding the recycled plastic is very difficult. In addition, contamination from incompatible plastics and other foreign materials produce inconsistent properties throughout the plastic and a poor quality product. Moreover, contamination can clog conventional plastics processing equipment, thereby making recovery of these materials unpractical.

Recycling of plastics at this time is limited primarily to packaging materials, such as plastic bottles and containers. The recycling of polyethylene terephthalate (PET) has been successful in part due to comparative ease of reclamation and volume of available high quality materials. Other materials which have experienced some success in recycling include high density polyethylene, polypropylene, polyvinyl chloride, polystyrene, polyacrylates, polycarbonates and polyurethanes.

A primary difficulty in recycling many products is the number of different plastics and the varying amounts of plastics in the product. Various processes have been proposed to separate the plastic materials according to type. However, these processes are difficult to control and are typically expensive. In addition, it can be difficult to identify some types of plastics by visual inspection.

Carpeting is one example of a product that usually includes a combination of different polymeric materials. In particular, the carpet fibers are generally different from the materials used for backing. Separating waste carpeting into the respective components is very difficult and generally not economically feasible. Post consumer carpets usually contain large amounts of dirt and other foreign materials which increase the difficulty of recycling. Each year, large volumes of waste carpet are discarded as industrial scrap in the form of trimmings during manufacture or installation as well as post consumer carpet. Regardless of the source, most carpet materials are difficult to recycle.

There has been some effort to recycle various materials that contain filaments or fibers. Examples of processes which use recycled materials are disclosed in U.S. Pat. No. 5,560,797 to Burt et al and U.S. Pat. No. 5,719,198 to Young et al.

Accordingly, there is a continuing need in the industry for processes of recycling various plastic materials and particularly carpeting.

SUMMARY OF THE INVENTION

The present invention relates to a product and to a process of producing a molded plastic product containing at least a portion of scrap or waste plastic materials. In particular, the present invention is directed to a process of producing a molded plastic product from carpet scrap.

Accordingly, a primary object of the invention is to provide a product and a process for producing a molded product using polyvinyl chloride-backed carpet scrap.

Another object of the invention is to provide a product and a process for producing a molded product containing recycled carpet scrap having a fiber component and a polyvinyl chloride component and additional polyvinyl chloride in an amount sufficient to form a polyvinyl chloride matrix having carpet fibers dispersed therein.

A further object of the invention is to provide a molded product containing recycled carpet scrap that is flexible and wear-resistant.

Still another object of the invention is to provide a flexible floor tile comprising about 10% to about 75% by weight of recycled carpet scrap where the floor tile contains the recycled carpet fibers uniformly dispersed therein.

Another object of the invention is to provide an economical process for recycling vinyl-backed carpet scrap into a durable product.

A further object of the invention is to provide a process for utilizing carpet scrap substantially without reducing the length of the carpet fibers.

Still another object of the invention is to provide a process of producing a molded matrix of polyvinyl chloride having recycled carpet fibers substantially uniformly dispersed therein.

These and other objects of the invention are attained by providing a product having a fiber-reinforced, flexible matrix, wherein said matrix comprises about 10% to about 75% by weight of waste scrap carpeting, said carpeting having a polyvinyl chloride backing and carpet fibers from a polymer having a melting point higher than the melting point of polyvinyl chloride, and about 25% to about 90% by weight of flexible polyvinyl chloride. The product can also contain up to about 5% by weight of a polyvinyl chloride plasticizer, and up to about 5% of a polyethylene copolymer. The matrix is a substantially continuous phase of polyvinyl chloride and carpet fibers dispersed therein.

The objects and advantages of the invention are further attained by providing a process for forming a molded article comprising the steps of supplying a feed mixture to the inlet of an extruder, said feed mixture comprising carpet scrap having a fiber component and a polyvinyl chloride component, and a source of flexible polyvinyl chloride, heating said feed mixture in said extruder to a temperature sufficient to melt said polyvinyl chloride of said carpet scrap and of said polyvinyl chloride source without melting said fiber component and substantially without reducing the fiber length, to form a substantially uniform mixture of melted polyvinyl chloride and an unmelted fiber component, discharging said mixture from said extruder and shaping and cooling said mixture to form a molded article of a matrix of polyvinyl chloride having said unmelted fiber component dispersed therein.

These and other objects, advantages and salient features of the invention will become apparent from the drawings and detailed description of the invention.

BRIEF DESCRIPTION OF THE DRAWINGS

The following is a brief description of the drawings which form a part of this original disclosure in which.

DETAILED DESCRIPTION OF THE INVENTION

Figure 1:
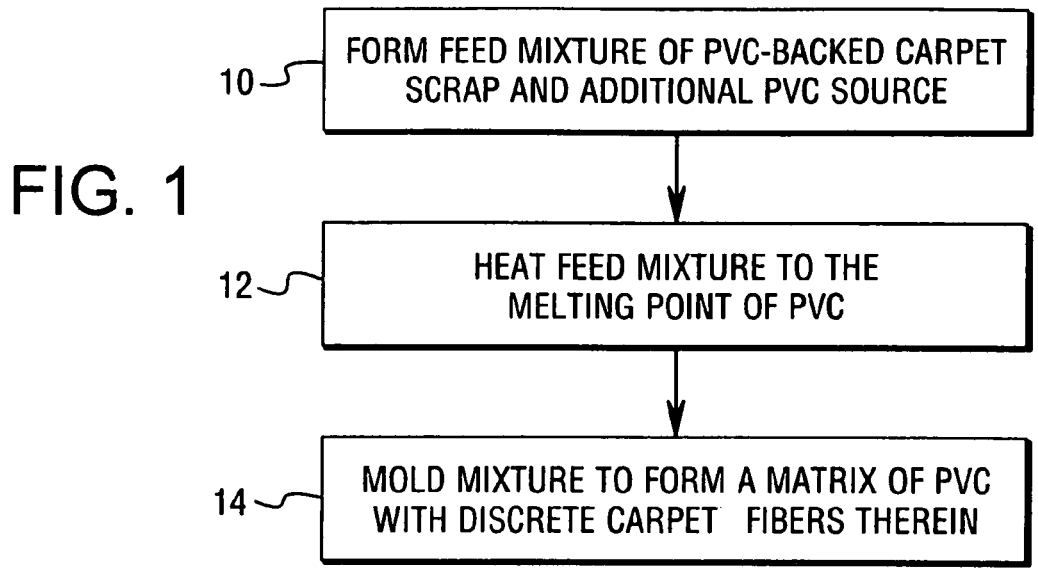
FIG. 1 is a schematic diagram of a flow chart of the process of the invention.

The present invention is primarily directed to a molded product and to a process for making a molded product using recycled carpet scrap. The invention is particularly directed to a process of forming a matrix of a substantially uniform mixture of a polyvinyl chloride base material and carpet fibers dispersed therein.

The carpeting in preferred embodiments of the invention is waste carpet scrap having a fiber component formed of various polymeric materials. In embodiments of the invention, the backing or binding material of the carpet contains polyvinyl chloride as a primary polymeric component. The backing material preferably contains about 30% to about 50% by weight of polyvinyl chloride based on the weight of the backing.

The recycled carpeting can include a combination of components which are made from various polymeric materials including, for example, polyvinyl chloride, polycarbonates, nylons, polyethylene terephthalate, acrylonitrile-butadiene-styrene copolymers, unsaturated and saturated polyesters and polyurethanes. Carpet materials can be woven or non-woven materials. Non-woven carpets are typically bonded with a suitable binding material. Non-woven carpets are generally; fiber mats where the fibers are bonded together by the bonding properties of the fibers or by a polymeric binding material. In embodiments of the invention, the recycled carpet scrap is from non-woven carpet squares or carpet tiles. Carpet tiles generally have a higher percentage of backing material compared to woven carpets.

Woven carpets can be tufted pile, cut pile or shag-type carpets. The carpet typically includes twisted yarns or rovings of natural or synthetic filaments that are needled through a base or backing fabric. The backing fabric can be, for example, a woven or non-woven material and generally includes a binding agent or a back coating. Commonly used back coatings include various glues or binders such as ethylene vinyl acetate copolymers which can be applied in the form of a latex coating and then heated to cure the coating onto the carpet. Alternatively, the copolymer backing can be applied as a hot melt extrusion which is cooled after being applied to the carpet. The back coating generally contains inorganic fillers such as calcium carbonate, magnesium carbonate, barium sulfate, magnesium silicate, such as talc, and mixtures thereof.

The carpeting used in the present invention is preferably post-consumer carpeting, post industrial carpet scrap or mixtures thereof. The carpet scrap comprises a fiber component and a backing material which includes polyvinyl chloride. The carpet scrap used in the present invention is generally referred to in the industry as vinyl-backed carpeting.

The fibers of the carpet scrap according to preferred embodiments of the invention are made of polymeric materials having a melting point of about 190° C. or higher, and preferably above about 200° C. An important aspect of the invention is the utilization of a carpet scrap material having a fiber component wherein the fibers have a melting point above the melting point or processing temperature of polyvinyl chloride whereby the carpet fibers do not melt, dissolve or decompose during processing to any significant extent. The carpet material generally contains about 10% to about 50% by weight of fibers based on the total weight of the carpet. Preferably, the carpet contains at least about 20% by weight of fibers. The carpet material preferably includes carpet fibers having a length of about ⅛ inch to about 2 inches. The carpet fibers are provided in the form of yarns or rovings made from filaments or fibers used in the manufacture of carpets.

The fibers in preferred embodiments of the invention are thermoset polymers or thermoplastic polymers having a melting point above the melting point of polyvinyl chloride. Examples of preferred polymeric fiber materials include polyamides, such as nylon 6 and nylon 66, and polyesters such as polyethylene terephthalate. In further embodiments, the fiber component can be a naturally occurring fiber, such as wool or cotton, or other fibrous materials such as fiberglass and other inorganic fibers.

The carpet material in accordance with the invention is generally referred to as a vinyl-backed carpet, and particularly, vinyl-backed carpet squares. The carpet material includes a backing or binder material which can be about 50% to about 90% by weight based on the total weight of the carpet. In preferred embodiments, the backing material contains about 30% to about 50% by weight of polyvinyl chloride based on the weight of the backing material. In further embodiments, the carpeting material contains about 15% to about 45% by weight of polyvinyl chloride based on the total weight of the carpet.

The backing material of carpet generally contains about 50% to about 80% by weight of other components, such as, inorganic fillers and latex materials, where the percentages are based on the weight of the backing. Examples of typical inorganic fillers include calcium carbonate, magnesium carbonate, magnesium silicate and barium sulfate. The carpet materials typically have a backing which contains about 10% to about 40% by weight of fillers, non-melting components and components that melt above the melting point of polyvinyl chloride based on the total weight of the carpet.

In one embodiment of the invention, the carpet is vinyl-backed carpet squares containing about 25% by weight nylon fibers and 75% by weight backing material. The backing material typically comprises about 30% by weight polyvinyl chloride, 15% by weight glass fibers and 55% by weight of other filler materials.

The additional source of polyvinyl chloride that is combined with the carpet material is preferably a flexible virgin plastic resin having a Shore A hardness of about 40 to about 100. The polyvinyl chloride can be in flake or pellet form. In further embodiments, at least a portion of the polyvinyl chloride can be recycled industrial scrap, post consumer recycled material and mixtures thereof.

The finished product is preferably sufficiently flexible to provide some resilience. In embodiments, a plasticizer is mixed with the carpet material and polyvinyl chloride in an amount to provide the desired flexibility to the final product. Generally, a plasticizer is added to the polyvinyl chloride in the amount of up to about 5% by weight based on the total weight of the mixture. The actual amount of plasticizer used will depend on the amount of polyvinyl chloride in the finished product, the hardness of the polyvinyl chloride in the carpet, the hardness of the added polyvinyl chloride and the amount of non-melting components in the carpet. In addition, the proportion of carpet fibers and the stiffness of the fibers will influence the flexibility of the finished product. A higher proportion of fibers in the finished product generally produce a stiffer product and requires a higher proportion of a plasticizer.

The plasticizers can be selected from the commercially available plasticizers for polyvinyl chloride. Examples of suitable plasticizers include benzyl phthalates, glycol benzoates, trimellitates, chlorinated paraffins, phosphate esters, adipates, azelates, sebacates, tris(2-ethylhexyl) phosphate, polymeric plasticizers and epoxy plasticizers. A particularly preferred plasticizer is bis(2-ethylhexyl) phthalate which typically is referred to as dioctyl phthalate. The plasticizer is incorporated into the polyvinyl chloride resin using conventional procedures. In preferred embodiments, the plasticizer is blended with the polyvinyl chloride before or simultaneously with mixing of the carpet material.

In further embodiments, up to about 5% by weight of an ethylene copolymer is combined with the feed mixture based on the total weight of the mixture to improve bonding between the polyvinyl chloride and the fiber component. A particularly preferred ethylene copolymer is ethylene vinyl acetate. A suitable ethylene vinyl acetate copolymer is available from E.I. DuPont de Nemours & Co. under the trademark "Elvax". The ethylene copolymer can be added as a separate component or can be a component of the carpet backing material.

Other additives can also be combined with the feed mixture to provide desired properties to the finished product. For example, suitable pigments or dyes, UV absorbing agents and fire retarding agents as known in the art can be included.

Referring to the flow chart of FIG. 1, the process of the invention basically includes the steps of forming a mixture of vinyl-backed carpet materials and an additional source of polyvinyl chloride resin as indicated by block 10 and heating the mixture while continuously mixing to melt the polyvinyl chloride, without melting the carpet fibers to any significant extent and to uniformly disperse the carpet fibers and other fillers in the resin as indicated by block 12. The mixture is then molded to form a matrix of a substantially homogenous mixture of polyvinyl chloride with discrete carpet fibers dispersed therein in a substantially uniform manner as indicated by block 14. The resulting matrix is a substantially continuous phase of polyvinyl chloride and carpet fibers dispersed therein. The carpet fibers in the matrix can have a length of up to about 2 inches.

Figure 2:
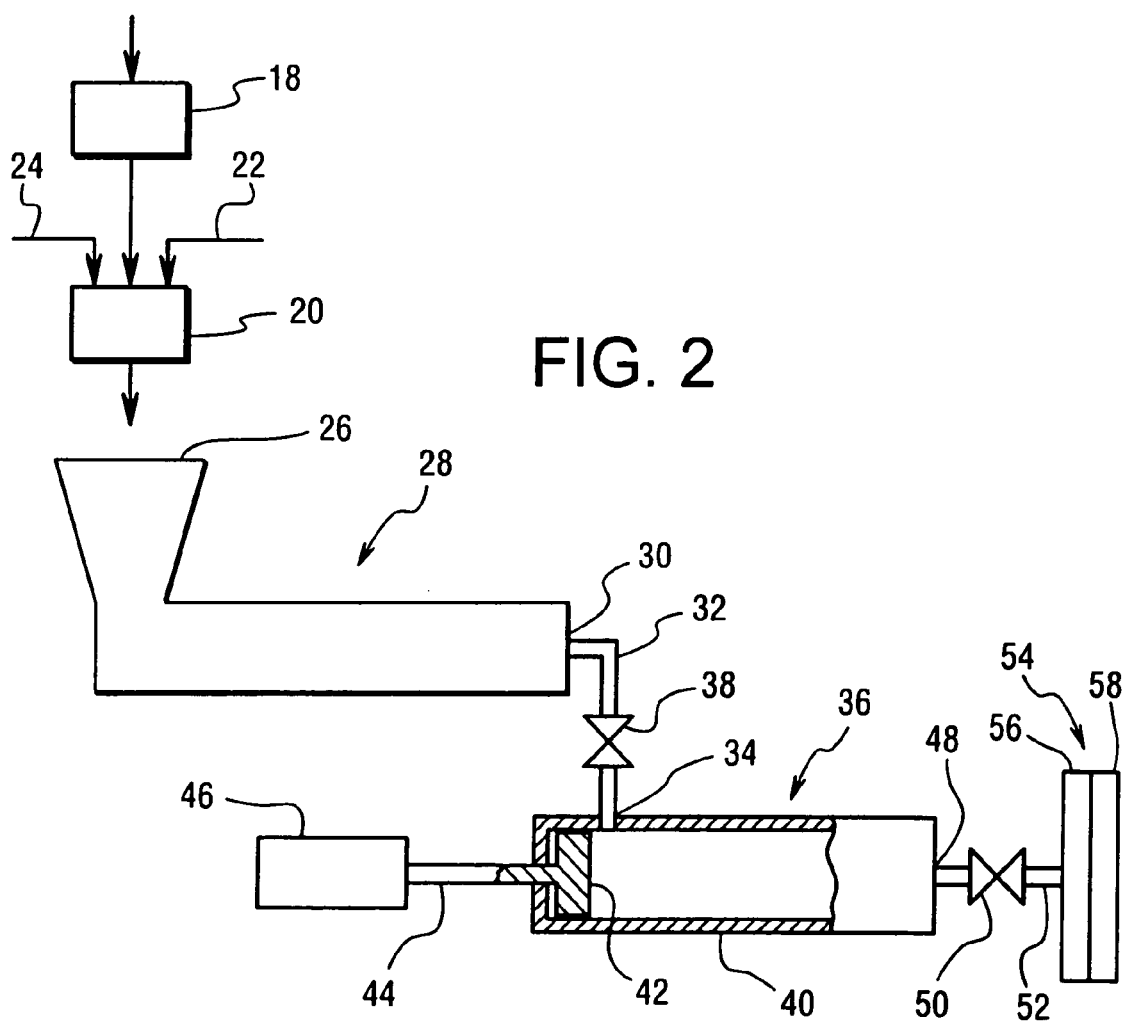
FIG. 2 is a side elevational view of an extruder assembly for producing a molded article in a preferred embodiment of the invention.

Referring to FIG. 2, vinyl-backed carpet is passed through a shredder 18 to reduce the size of the carpet pieces to about 2 inches or less. The actual size of the shredded carpet pieces is not critical to the process of the invention. The only requirement or limitation of the size of the carpet pieces is the handling and feeding difficulties of large, cumbersome carpet pieces into the processing equipment. In addition, large pieces can be snagged and block the inlet to the processing equipment. In preferred embodiments, the carpet pieces are reduced to the largest size possible while avoiding clogging of the equipment. Suitable shredding devices can be used as known in the art to tear the carpet backing or binder materials substantially without reducing the length of the fibers which make up the carpet. In preferred embodiments, a substantial portion of the carpet fibers are not cut or torn during the shredding step.

The shredded carpet is discharged from shredder 18 to a mixing device 20. A source of polyvinyl chloride is added to mixing device 20 through line 22 whereby the components are uniformly mixed to form a substantially uniform feed mixture. Additional additives, such as a plasticizer and an ethylene copolymer, can be added as needed through a line 24 to mixing device 20. Mixing device 20 can be a paddle-type device or a continuous screw mixer as known in the art. The feed mixture depends on the desired composition of the final product. In embodiments, the feed mixture contains about 10% to about 75% by weight of carpet scrap and about 25% to about 90% by weight polyvinyl chloride based on the total weight of the feed mixture. The carpet scrap of the feed mixture includes a fiber component and a polyvinyl chloride component. The added polyvinyl chloride of the feed is preferably a flexible polyvinyl chloride.

The feed mixture is then supplied to the inlet 26 of an extruder 28. Extruder 28 can be a single or twin screw extruder having a heated jacket. The extruder 28 continuously conveys and mixes the feed mixture while heating to a temperature sufficient to melt the polyvinyl chloride of the carpet backing and the additional polyvinyl chloride added to the feed mixture. The heating temperature of the extruder is maintained below the melting temperature or decomposition temperature of the fiber component of the carpet. In preferred embodiments of the invention, the feed mixture is heated to a temperature of about 140° C. to about 190° C., which is typically effective to melt the polyvinyl chloride without melting the fiber component. The resulting mixture has a melt flow index of less than 5 and often less than about 1.

The extruder mixes the components of the feed to form a substantially continuous phase of melted polyvinyl chloride having the discrete carpet fibers and other fibers and fillers uniformly dispersed therein. The action of the conveyor screw and the heat, melts the polyvinyl chloride of the backing material and enables the separation of fiber tufts and fiber bundles of the carpet into smaller fiber bundles and discrete fibers. Preferably, the extruder mixes the components of the feed mixture substantially without reducing the length of the carpet fibers. The inorganic fillers, latex and other components of the carpet backing which do not melt can be reduced in particle size by the shredder or by mixing in the extruder and dispersed in the melted polyvinyl chloride phase. In preferred embodiments, the finished product contains carpet fibers having a length substantially equal to the length of the carpet fibers of the feed mixture.

The extruder 28 includes an outlet 30 coupled to a conduit 32 for carrying the melted mixture to the inlet 34 of a second extruder 36. A valve 38, such as a hydraulically controlled valve, is provided in conduit 32 to control the flow of material. Extruder 36 in the embodiment illustrated is a plunger-type extruder and includes a cylinder 40 and reciprocating plunger 42. Plunger 42 includes a connecting rod 44 and an actuator, such as an hydraulic piston and cylinder assembly 46. During the processing operation, the polyvinyl chloride/fiber mixture is fed from extruder 28 through valve 38 into extruder 36. When a desired amount of material is supplied to extruder 36, valve 38 is closed. Cylinder 40 preferably includes a heating jacket to maintain the temperature of the material being extruded and prevent solidification. In preferred embodiments, valve 38 is able to cut any carpet fibers in the valve to prevent clogging or jamming of the valve.

The reciprocating plunger 42 is then actuated to extrude the material through an outlet 48. A hydraulically controlled valve 50 is provided in a conduit 52 coupled to outlet 48 for controlling the flow of material from extruder 36. Typically reciprocating plunger 42 forces the material from the cylinder at a pressure of about 50 to about 300 bar.

In the embodiment illustrated, conduit 52 is coupled to a mold 54 having complementing halves 56, 58. The material is injected into the mold 54 at pressures of 50 to 300 bar to form a molded product. Mold 54 is preferably a standard injection mold assembly having a cooling jacket (not shown) for circulating water or other coolant. The mold halves 56, 58 are clamped together during the molding process by hydraulic cylinders which apply a clamping force of about 50 to 800 metric tons. After a predetermined time necessary to solidify the material, the mold is opened to remove the molded product.

In preferred embodiments of the invention, the finished product is made by injection molding as discussed above. In further embodiments, the molded product can be produced by extrusion molding where the material is extruded through an appropriately shaped die. In still further embodiments, the material can be molded by compression molding techniques.

In preferred embodiments of the invention, the finished product is an injection molded floor tile. The process and composition produce a durable and flexible tile having a substantially continuous flexible and resilient matrix of polyvinyl chloride with discrete carpet fibers dispersed therein in a substantially uniform manner. In preferred embodiments, the dispersed carpet fibers are polyamide or polyester fibers having a length substantially the same as the original carpet fibers. The fibers provide a tough, durable wear surface so that a laminated wear surface is generally not necessary. Typically, the matrix contains about 5% to about 20% by weight of a fiber component and about 10% to about 40% by weight of filler materials and the remainder polyvinyl chloride based on the total weight of the finished product. The filler materials generally include non-melting materials in the feed mixture including latexes, inorganic fillers in the carpet backing and dirt in post-consumer carpet. In preferred embodiments, the matrix contains about 10% to 20% by weight of the fiber component based on the total weight of the molded product.

The composition and process are able to form molded products of various sizes and shapes. For example, injection molded floor tiles have a thickness of about 0.2 to about 0.75 inch thick and a length and width of about 12 inches to about 24 inches.

The amount of polyvinyl chloride in the finished matrix of the molded product is preferably sufficient to form a substantially continuous polyvinyl chloride matrix and typically contains about 25% to about 90% polyvinyl chloride based on the total weight of the molded product. In preferred embodiments, the matrix of the molded product contains about 45% to about 85% by weight polyvinyl chloride.

The source of polyvinyl chloride in the matrix can vary depending on the amount of polyvinyl chloride in the carpet material. The amount of fiber and other non-melting components of the carpet determine the amount of polyvinyl chloride combined with the carpet in the feed. In preferred embodiments, the molded product comprises about 10% to about 55% by weight of polyvinyl chloride from the carpet material.

The fiber content and the content of non-melting components of the carpet make the molded product stiffer than a product made entirely of polyvinyl chloride. The fiber content and non-melting components of the carpet serve as a filler for polyvinyl chloride matrix and increase the wear-resistance and durability. A particular advantage of the invention is the ability to use post-consumer carpeting without the need to clean or otherwise process the waste carpet before use. The post-consumer carpet can be used with the dirt and other foreign materials normally present in waste carpeting.

In one embodiment of the invention, the molded product contains about 45% polyvinyl chloride, 15% fiber and about 40% inert materials, where the percentages are based on the weight of the molded product.

In one embodiment of the invention, the molded product is formed from about 50% vinyl-backed carpet squares having about 25% by weight nylon fiber and 70% backing. The backing material contains about 30% by weight polyvinyl chloride, 15% by weight nylon fiber and 55% filler. The resulting molded product has a Shore hardness of about 90-95, a tensile strength of about 3200-4300 psi, modulus of elasticity of about 100,000 to 130,000 psi, a tear strength of about 100-150 lb/in and an abrasion resistance of about 0.4 g loss by the Taber method, 500 g Wheel, 1000 cycles.

A plasticizer can be added to the feed mixture to increase the flexibility and reduce the hardness of the polyvinyl chloride matrix to compensate for the increased stiffness caused by a high fiber content. The plasticizer is preferably added to the mixer with the shredded carpet and polyvinyl chloride to form part of the feed mixture to the extruder. The plasticizer is usually included in amounts up to about 5% by weight based on the total weight of the molded product. The non-melting components of the carpeting including dirt, latexes, fibers, inorganic fillers and other impurities make up about 10% to about 40% by weight of the molded product.

Figure 3:
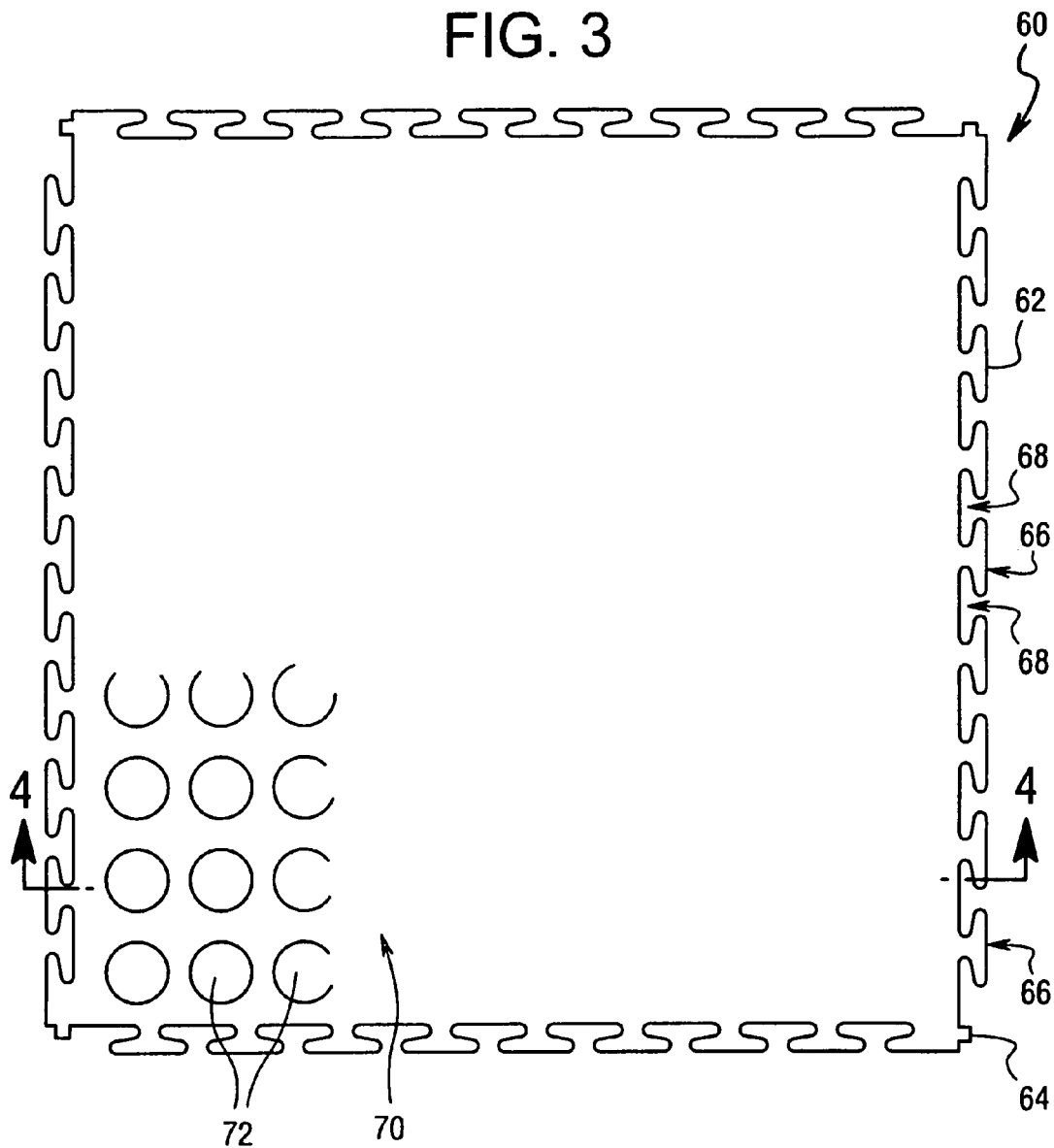
FIG. 3 is a top plan view of a molded floor tile produced by the process of the invention.
Figure 4:
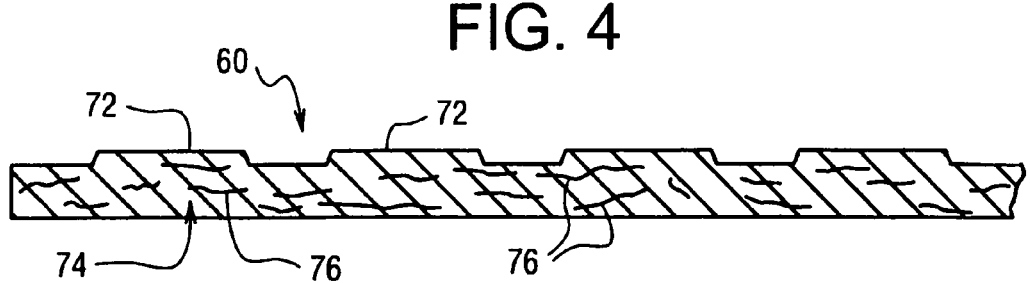
FIG. 4 is a partial cross-sectional side view of the floor tile of FIG. 3.

In preferred embodiments, the molded product is a resilient, interlocking floor tile produced by injection molding. Referring to FIGS. 3 and 4, a preferred injection molded floor tile 60 is shown. As shown in FIG. 3, the tile 60 has a substantially square shape having four identical side edges 62. Each side edge 62 has a square tab 64 and a plurality of spaced-apart interlocking tabs 66. Tabs 66 have a substantially T-shape and are separated by a space 68 receiving a tab 66 of an adjacent tile 60. A plurality of tiles 60 interlock together to form a continuous floor surface. Tile 60 has a wear surface 70 having a plurality of raised circular areas 72 to provide a non-slip surface.

Referring to FIG. 4, floor tile 60 is preferably a solid structure with no voids or air pockets. The tile 60 is formed from a substantially continuous matrix 74 of polyvinyl chloride having fibers 76 and other filler materials dispersed therein. It will be understood that FIGS. 3 and 4 illustrate one embodiment of a floor tile although other shapes and configurations can be produced from the process of the invention.

Although various embodiments have been selected to illustrate the invention, it will be understood by those skilled in the art that various modifications can be made without departing from the spirit and scope of the invention as defined in the following claims.

What is claimed is:

1. A fiber-reinforced, flexible matrix, wherein said matrix comprises:
   about 10% to about 75% by weight of waste scrap carpeting, wherein said carpeting has a first polymer backing and carpet fibers from a polymer having a melting point higher than the melting point of polyvinyl chloride and where said waste scrap carpeting comprises about 50% to about 80% by weight of non-melting filler materials including inorganic fillers based on the weight of said backing; and about 25% to about 90% by weight of a flexible second polymer, wherein said matrix is a substantially continuous phase of said first and second polymers having said carpet fibers and inorganic fillers dispersed therein, wherein said substantially continuous phase is formed by melting said first and second polymers and wherein said carpet fibers are not melted, and said matrix is a substantially homogenous mixture of polyvinyl chloride and discrete carpet fibers having a length of about ⅛ to about 2 inches.

2. The matrix of claim 1, further comprising a polyvinyl chloride plasticizer.

3. The matrix of claim 2, wherein said plasticizer is dioctyl phthalate.

4. The matrix of claim 1, further comprising a polyethylene copolymer.

5. The matrix of claim 1, wherein said polymeric fibers are selected from the group consisting of polyamide fibers, polyester fibers and mixtures thereof.

6. The matrix of claim 1, wherein said matrix comprises about 45% to about 85% by weight polyvinyl chloride.

7. The matrix of claim 1, wherein said flexible second polymer is flexible polyvinyl chloride is virgin polyvinyl chloride having a Shore A hardness of about 40 to about 100.

8. The matrix of claim 1, wherein said carpet scrap is selected from the group consisting of carpet scrap, post consumer carpet scrap, post industrial scrap, and mixtures thereof.

9. The matrix of claim 1, wherein said matrix comprises about 5-20% by weight carpet fibers.

10. The matrix of claim 1, wherein said matrix comprises about 10-55% by weight polyvinyl chloride from said carpet.

11. The matrix of claim 1, wherein said carpet comprises about 15% fiber, about 45% polyvinyl chloride backing and about 40% inert material wherein the percentages are based on the weight of the matrix.

12. The matrix of claim 1, wherein said first polymer is polyvinyl chloride.

13. A process of forming a fiber reinforced, flexible molded article comprising the steps of:

supplying a feed mixture to the inlet of an extruder, said feed mixture comprising about 25% to about 90% flexible polyvinyl chloride and about 10% to about 75% carpet scrap based on the total weight of said feed mixture, said carpet scrap having a fiber component and a backing material where said backing material includes about 30% to about 50% by weight of a first polymer component;

heating said feed mixture in said extruder to a temperature sufficient to melt said first polymer component of said carpet scrap and of said flexible polyvinyl chloride substantially without melting said fiber component and substantially without reducing the fiber length to form a substantially uniform and continuous mixture of said first polymer component and said melted polyvinyl chloride and an unmelted fiber component; and discharging said substantially uniform mixture from said extruder and shaping and cooling said mixture to form a molded flexible article of a matrix of a substantially continuous phase of said first polymer component and said polyvinyl chloride having said unmelted fiber component dispersed therein.

14. The process of claim 13, wherein said molded flexible article comprises about 5% to about 20% by weight of said fiber component, and about 45% to about 85% by weight of said first polymer component and polyvinyl chloride.

15. The process of claim 13, wherein said molded flexible article comprises about 10% to about 55% by weight polyvinyl chloride supplied from said carpet scrap.

16. The process of claim 13, wherein said uniform mixture of melted polyvinyl chloride and unmelted fiber component has a melt flow index of less than about 5.

17. The process of claim 13, wherein said fiber component comprises polyamide fibers, polyester fibers, and mixtures thereof.

18. The process of claim 13, further comprising comminuting said carpet scrap into pieces of up to about 2 inches in length prior to feeding to said extruder.

19. The process of claim 13, comprising heating said feed mixture to about 140° to about 190° C. to melt said polyvinyl chloride substantially without melting said fiber component.

20. The process of claim 13, wherein said flexible polyvinyl chloride has a Shore A hardness of about 40 to about 100.

21. The process of claim 13, wherein said matrix comprises about 10% to about 40% by weight of unmelted filler materials from said carpet.

22. The process of claim 13, wherein said carpet scrap contains about 50% to 80% by weight inorganic fillers and latex materials based on the weight of the backing, and where said inorganic fillers and latex materials are dispersed in said continuous phase.

* * * * *